Oct. 21, 1924.

F. BECK 1,512,078

AUTOMATIC CHUCK

Filed July 13, 1923   2 Sheets-Sheet 1

Inventor
F. Beck

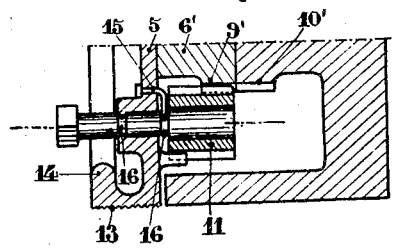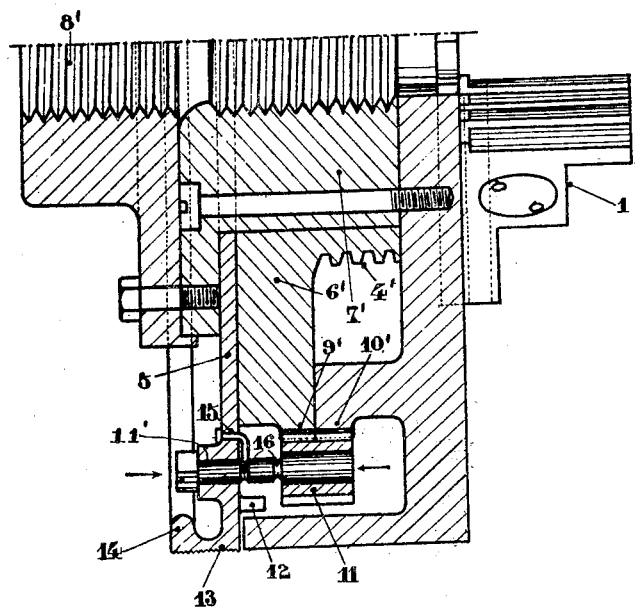

Patented Oct. 21, 1924.

1,512,078

UNITED STATES PATENT OFFICE.

FRÉDÉRIC BECK, OF NEUILLY-SUR-SEINE, FRANCE.

AUTOMATIC CHUCK.

Application filed July 13, 1923. Serial No. 651,389.

*To all whom it may concern:*

Be it known that I, FRÉDÉRIC BECK, a French citizen, and resident of 46 Rue Ibry, Neuilly-sur-Seine, Seine, France, have invented certain new and useful Improvements in Automatic Chucks, of which the following is a specification.

This invention has for its subject an automatic chuck in which the tool or the work to be operated upon is simultaneously tightened and centered by means of jaws operated by a worm through the medium of pinions which engage with racks forming the base of the jaws.

This automatic chuck has the following characteristic features:

1. The tightening and centering system of this chuck includes an operating plate which may be turned by hand and a plate which is integral with a worm and is provided with peripheral teeth. The chuck is provided with a toothed flange of the same diameter as the plate secured to the worm but has one tooth less than the number of teeth in the latter plate. The operating plate carries a planet pinion which may be moved parallel to its axis so as to engage either solely with the teeth on the plate secured to the worm or to engage both with these teeth and the teeth of the flange, the said pinion when in the first position being adapted to be locked to its shaft. In order to bring the jaws rapidly into engagement with the work or tool to be secured in the chuck, the planet pinion is moved into its first position and the operating plate is turned. For the purpose of obtaining the final tightening, the planet pinion is moved into its second position and the operating plate turned; the two toothed flanges and the planet pinion thus form a differential gear train and at each complete turn of the operating plate the plate of the worm is advanced through one tooth.

2. The system of mounting the pinions engaging with the racks consists of bearings having the shape of arcs of a circle and being of a number corresponding to the number of pinions. These bearings are disposed on the same circumference and free spaces are formed between them. The shaft of each of the pinions gearing with the racks is mounted in two consecutive bearings.

In the accompanying drawing are illustrated, solely by way of example, two forms of construction according to the invention.

Figure 3 shows a half axial section of a second form of automatic chuck.

Figure 4 shows a portion of Figure 3 with the planet pinion in a different position.

The chucks to which the invention is applied in the accompanying drawing and hereinafter described are provided with jaws 1 provided with racks 2 engaging with pinions 3 which also engage with a worm 4.

Figure 1:
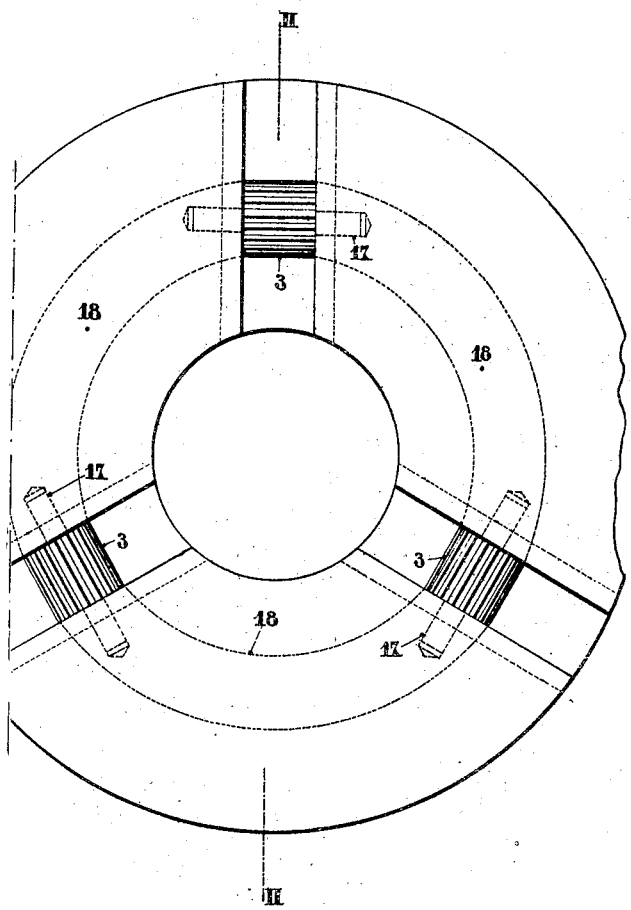
Figure 1 illustrates a front elevation of one form of automatic chuck, the jaws being removed.
Figure 2:
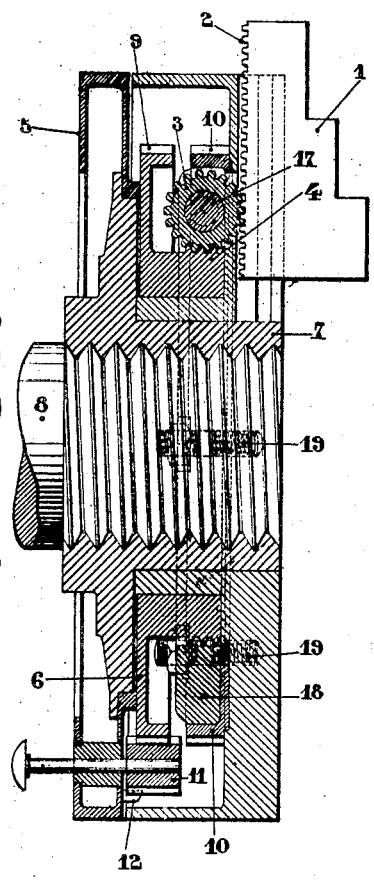
Figure 2 illustrates a section on the line II—II of Figure 1, with one of the jaws in position.

One of the characteristic features of the invention consists in a system of tightening and centering the tool or the work to be operated upon, this system being applied to the chuck shown in Figures 1 and 2 and to the chuck illustrated in Figures 3 and 4. This tightening and centering system includes an operating plate 5 and a plate 6 integral with the worm 4. The plate 5 is loosely mounted on an internally screwed sleeve 7 which is screwed on the shaft 8 of the machine tool, the shaft 8 being screw threaded for this purpose. The plate 6 is provided around its periphery with teeth 9. The chuck is cup-shaped and on the inner face thereof is secured a toothed flange 10 of the same diameter as the plate 6 but provided with a tooth less. On the plate 5 is mounted a planet pinion 11 which is adapted to slide parallel to the axis of the chuck and which is adapted to engage either with the plate 6 only or both with the plate 6 and the toothed flange 10. In the first position the pinion 11 is locked by a pin 12 projecting from the plate 5. The plate 5, as shown in Figures 3 and 4, is preferably provided with a milled surface 13 and an inwardly turned edge 14 for facilitating its operation. As will also be seen in Figures 3 and 4 a locking member 15 formed of springy material for example may also be provided which is adapted to hold the pinion 11 in one or the other of its two positions by springing into engagement with the one or the other of the annular grooves 16 provided in the shaft 11' of the pinion.

In order to move the jaws 1 rapidly into engagement with the work or tool to be secured in the chuck, the pinion 11 is moved into a position so as to engage only with the teeth of the plate 6'. As the pinion 11 will now be locked by the pin 12, the plate 6' will be locked in relation to the plate 5 so that when turning the latter the plate 6' will be turned positively therewith thus actuating the operating pinions 3 and jaws 1.

In order to produce the final tightening the pinion is moved into a position so that it engages both with the teeth of the plate 6' and with the toothed flange 10' as shown in Figure 3. In this position the pinion 11, the plate 6' and the flange 10' form a differential gear train and at each complete turn of the plate 5 the plate 6' is advanced by one tooth.

Another characteristic feature of the invention consists in the system of mounting the pinions 3 on the chuck. In this system (Figures 1 and 2) the shafts 17 shown conventionally of these pinions are mounted in the end of bearings 18 in the form of arcs of a circle. These bearings are disposed on the same circumference having its centre at the axis of the chuck. They correspond in number to the number of pinions 3. The bearings are secured to the chuck by any suitable means, for example by bolts 19. Each of the shafts 17 is mounted in two consecutive bearings.

The arrangements forming the subject of the present invention have the following advantages:

The application of the tightening and centering system above described enables the tool or work to be operated upon to be secured rapidly in the chuck.

The bearings in the form of arcs of a circle afford, in comparison with the usual systems of mounting the shafts of the pinions gearing with the racks, the advantage of being lighter and more economical. Moreover they can be mounted in position and removed more rapidly.

Having thus described my invention what I claim as new and desire to secure by Letters Patent is:—

1. In an automatic chuck the combination with a chuck, and jaws radially movable in said chuck, said jaws having racks on their rear faces, of a worm rotatably mounted in the centre of the chuck, a plurality of pinions gearing with said worm and with the racks on the jaws, a toothed plate formed integral with the worm and having teeth on its periphery, a plate rotatably mounted in said chuck, and adapted to be turned by hand, a toothed flange secured to the inner face of the chuck, said flange being of the same diameter as the plate integral with the worm, but having one tooth less than the said plate, a shaft slidably mounted in the plate loosely mounted in the chuck, a pinion keyed to said shaft, said shaft being adapted to be moved into two positions, in one of which the pinion engages only with the toothed plate integral with the worm, and in the second position the toothed pinion engages both with the toothed plate integral with the worm and with the toothed flange, and means for locking the pinion in position when in its first position.

2. In an automatic chuck the combination with a chuck, and jaws radially movable in said chuck, said jaws having racks on their rear faces, of a worm rotatably mounted in the centre of the chuck, a plurality of bearings, each of said bearings being in the form of an arc of a circle, a plurality of pinions, the number of pinions being equal to the number of bearings, said pinions being mounted between the adjacent ends of two consecutive bearings, said pinions gearing with the worm and with the racks on the jaws, a toothed plate formed integral with the worm and having teeth on its periphery, a plate rotatably mounted in said chuck, and adapted to be turned by hand, a toothed flange secured to the inner face of the chuck, said flange being of the same diameter as the plate integral with the worm, but having one tooth less than the said plate, a shaft slidably mounted in the plate loosely mounted in the chuck, a pinion keyed to said shaft, said shaft being adapted to be moved into two positions, in one of which the pinion engages only with the toothed plate integral with the worm, and in the second position the toothed pinion engages both with the toothed plate integral with the worm, and with the toothed flange, and means for locking the pinion in position when in its first position.

In testimony whereof I have signed my name to this specification.

FRÉDÉRIC BECK.